US011059399B1

(12) United States Patent
Line et al.

(10) Patent No.: US 11,059,399 B1
(45) Date of Patent: Jul. 13, 2021

(54) VEHICLE SEATING ASSEMBLY

(71) Applicant: Ford Global Technologies, LLC, Dearborn, MI (US)

(72) Inventors: Johnathan Andrew Line, Northville, MI (US); Benjamin Yilma, Canton, MI (US); Spencer Robert Hoernke, Dundas (CA); Jason Matthew Koberstein, Troy, MI (US); Sean Bayle West, Monroe, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/939,302

(22) Filed: Jul. 27, 2020

(51) Int. Cl.
*B60N 2/28* (2006.01)
*B60N 2/22* (2006.01)

(52) U.S. Cl.
CPC ............. *B60N 2/2893* (2013.01); *B60N 2/22* (2013.01)

(58) Field of Classification Search
CPC ........................... B60N 2/2893; B60N 2/2887
See application file for complete search history.

(56) References Cited

U.S. PATENT DOCUMENTS

| 10,220,735 B1 * | 3/2019 | Nae ..................... B60N 2/3011 |
| 2010/0109215 A1 * | 5/2010 | Ruthinowski ........ B60N 2/2887 |
| | | 267/140.13 |

FOREIGN PATENT DOCUMENTS

| CA | 2990550 A1 * | 12/2016 | ........... B60N 2/2893 |
| DE | 10128670 C1 * | 6/2002 | ........... B60N 2/2893 |
| DE | 102018123716 A1 * | 3/2020 | ........... B60N 2/2893 |
| EP | 1336530 A2 * | 8/2003 | ........... B60N 2/2893 |
| FR | 2917023 A1 * | 12/2008 | ............. B60N 2/682 |
| JP | 2001063426 A * | 3/2001 | ........... B60N 2/2893 |
| JP | 2001270359 A * | 10/2001 | ........... B60N 2/6009 |
| JP | 2003226173 A | 8/2003 | |
| JP | 2014028607 A | 2/2014 | |
| WO | 0027669 A1 | 5/2000 | |
| WO | 2020027242 A1 | 2/2020 | |

* cited by examiner

*Primary Examiner* — Timothy J Brindley
(74) *Attorney, Agent, or Firm* — David Coppiellie; Price Heneveld LLP

(57) ABSTRACT

A retractable anchor assembly for a seating assembly includes an actuating arm operably coupled with a seatback and defining a guide slot. The actuating arm may be movable with the seatback. A guide plate may be coupled with a seat base and may define an arm receiving slot configured to receive the actuating arm. A support plate may be slidably coupled with the guide plate. The support plate may include a side fastener received by the guide slot of the actuating arm. An anchor may be coupled with the support plate. Movement of the actuating arm through the arm receiving slot may be configured to move the support plate and anchor between an extended positioned and a retracted position.

20 Claims, 11 Drawing Sheets

VEHICLE SEATING ASSEMBLY

FIELD OF THE DISCLOSURE

The present disclosure generally relates to a vehicle seating assembly, and more specifically to a vehicle seating assembly having a retractable ISOFix anchor assembly.

BACKGROUND OF THE DISCLOSURE

ISOFix anchors are used in vehicles to couple child seats with vehicle seating assemblies. The ISOFix anchors may be covered when not in use.

SUMMARY OF THE DISCLOSURE

According to one aspect of the present disclosure, a retractable anchor assembly for a seating assembly includes an actuating arm operably coupled with a seatback and defining a guide slot. The actuating arm may be movable with the seatback. A guide plate may be coupled with a seat base and may define an arm receiving slot configured to receive the actuating arm. A support plate may be slidably coupled with the guide plate. The support plate may include a side fastener received by the guide slot of the actuating arm. An anchor may be coupled with the support plate. Movement of the actuating arm through the arm receiving slot may be configured to move the support plate and anchor between an extended positioned and a retracted position.

Embodiments of this aspect of the disclosure can include any one or a combination of the following features:
  the support plate defining a coupling slot configured to receive a coupling fastener extending from guide plate;
  the coupling fastener being positioned at a first end of the coupling slot when the support plate and the anchor are in the extended position and being positioned at a second end of the coupling slot when the support plate and the anchor are in the retracted position;
  the actuating arm including a first end and a second end;
  the guide slot being defined at an incline extending upward away from the second end;
  the side fastener being fixedly coupled with the support plate;
  the support plate being in the extended position when the side fastener is at an upper end of the guide slot and being in the retracted position when the side fastener is at a lower end of the guide slot;
  a spring coupled with the support plate and the guide plate, and the support plate is biased by the spring toward the extended position;
  the support plate including at least one guide tab, and the guide plate defines at least one tab receiving slot configured to receive the at least one guide tab; and/or
  the anchor being one of a pair of child seat anchors.

According to another aspect of the present disclosure, a retractable anchor assembly for a seating assembly includes an actuating arm operably coupled with a seatback and defining a guide slot. A guide plate may be coupled with a seat base and may define an arm receiving slot proximate an end of the guide plate. The arm receiving slot may be configured to receive the actuating arm. The actuating arm may be moved through the arm receiving slot when the seatback is moved between an upright position and a reclined position. A support plate may be slidably coupled with the guide plate and may include a side fastener received by and movable along the guide slot of the actuating arm. An anchor may extend from the support plate. Movement of the actuating arm through the arm receiving slot may be configured to move the anchor between an extended position and a retracted position. A spring may extend between and may be coupled with the guide plate and the support plate. The spring may be configured to bias the anchor in the extended position.

Embodiments of this aspect of the disclosure can include any one or a combination of the following features:
  the guide plate defining a tab receiving slot and including a spring mount proximate an end of the tab receiving slot;
  the support plate including a guide tab configured to be received by the tab receiving slot;
  the spring extending between the spring mount of the guide plate and the guide tab of the support plate;
  the guide plate including first and second sidewalls extending upward from a body of the guide plate, and each of the first and second sidewalls includes a coupling flange configured to be aligned with and coupled with the seat base;
  the coupling flanges of the first and second sidewalls being positioned at an angle relative to the body of the guide plate to align the support plate and anchor with a rear edge of the seat base;
  a coupling fastener fixedly coupled with the guide plate, and the support plate defines a coupling slot configured to receive the coupling fastener to slidably couple the support plate with the guide plate;
  the coupling fastener being positioned at a first end of the coupling slot when the anchor is in the extended position and being positioned at a second end of the coupling slot when the anchor is in the retracted position;
  the anchor being a child seat anchor; and/or
  the upright position of the seatback corresponding with the extended position of the anchor and the reclined position of the seatback corresponding with the retracted position of the anchor.

According to another aspect of the present disclosure, a retractable anchor assembly for a seating assembly includes an actuating arm rotatably coupled with a seatback and defining an inclined guide slot. A guide plate may be coupled with a seat base and may define an arm receiving slot and a tab receiving slot. The actuating arm may be configured to be received by the arm receiving slot. A support plate may be slidably coupled with the guide plate and may define an anchor guide. A side fastener may be coupled with the support plate and may be slidably received by the guide slot of the actuating arm. The side fastener may be positioned at a lower end of the guide slot when the seatback is in an upright position and may be positioned at an upper end of the guide slot when the seatback is in a reclined position. A guide tab may be integrally formed with the support plate and may be received by the tab receiving slot of the guide plate. An anchor may be coupled with the support plate. Movement of the actuating arm through the arm receiving slot may be configured to move the anchor between an extended position and a retracted position. The extended position may correspond with the upright position of the seatback and the retracted position may correspond with the reclined position of the seatback. A spring may be coupled with the guide plate and the guide tab of the support plate. The spring may be configured to bias the anchor in the extended position.

Embodiments of this aspect of the disclosure can include any one or a combination of the following features:
  the anchor being a child seat anchor;

a spring mount extending from the guide plate proximate an end of the tab receiving slot, and the spring is coupled with the spring mount; and/or the actuating arm comprising a pair of actuating arms positioned on opposing sides of the seatback, and the arm receiving slot of the guide plate is one of a pair of arm receiving slots defined on opposing ends of the guide plate.

These and other aspects, objects, and features of the present invention will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
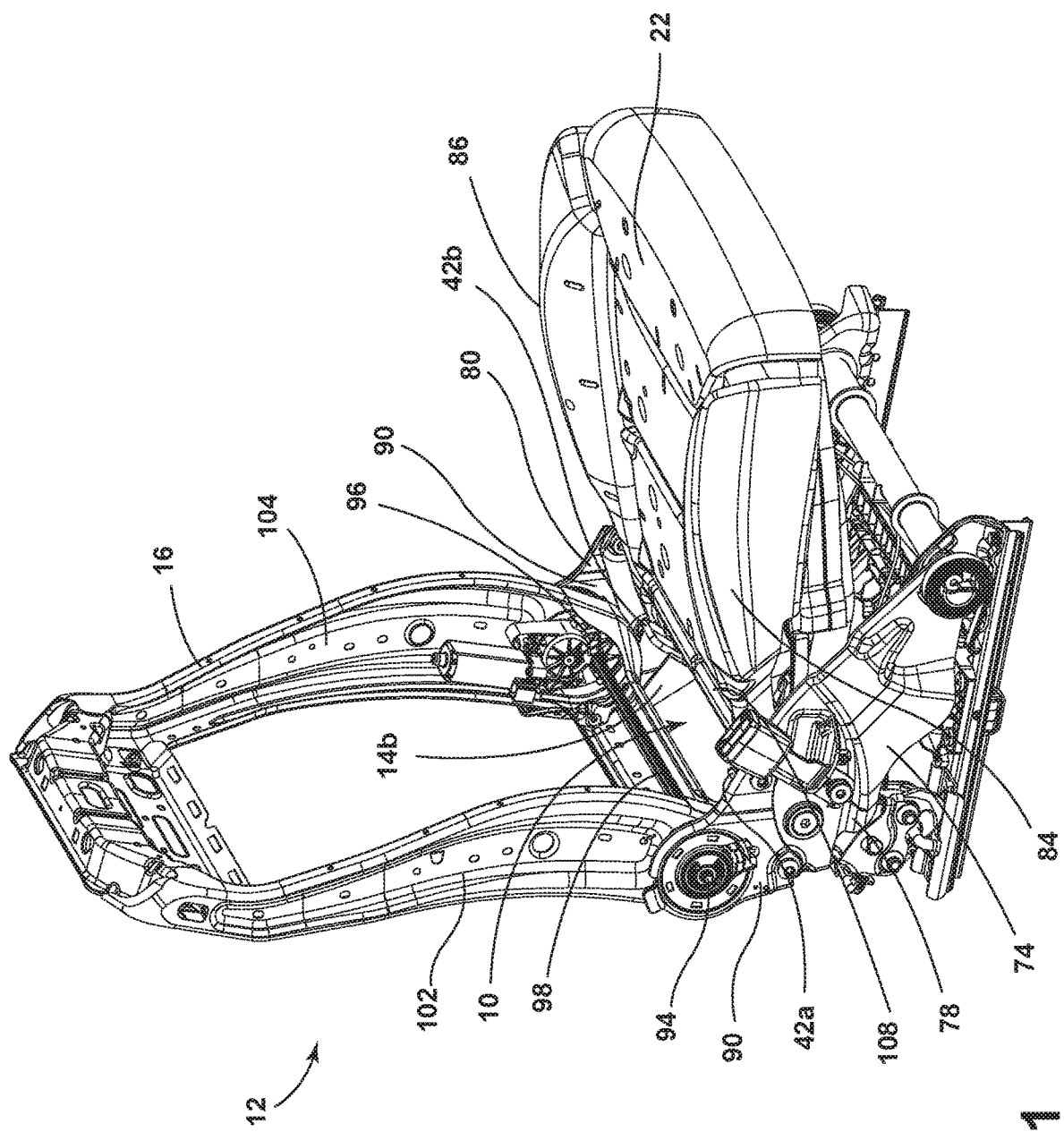
FIG. 1 is a side perspective view of a seating assembly in a first position, according to various examples, according to various examples.

The present illustrated embodiments reside primarily in combinations of method steps and apparatus components related to a retractable anchor assembly for a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-11, reference numeral 10 generally designates a retractable anchor assembly for a vehicle seating assembly 12. The retractable anchor assembly 10 includes an actuating arm 14a, 14b rotatably coupled with a seatback frame 16 and defining an inclined guide slot 18a, 18b. A guide plate 20 is coupled with a seat base frame 22. The guide plate 20 defines an arm receiving slot 24a, 24b and a tab receiving slot 26a, 26b. The actuating arm 14a, 14b is configured to be received by the arm receiving slot 24a, 24b. A support plate 28 is slidably coupled with the guide plate 20 and defines a coupling slot 30 configured to guide movement of the support plate 28 relative to the guide plate 20. A side fastener 32a, 32b is coupled with the support plate 28 and is slidably received by the guide slot 18a, 18b of the actuating arm 14a, 14b. The side fastener 32a, 32b is positioned at a lower end 34 of the guide slot 18a, 18b when the seatback frame 16 is in an upright position and is positioned at an upper end 36 of the guide slot 18a, 18b when the seatback frame 16 is in a fully reclined position. The side fastener 32a, 32b may be positioned at any point along the guide slot 18a, 18b depending on the selected recline of the seatback frame 16. A guide tab 40a, 40b is integrally formed with the support plate 28 and is received by the tab receiving slot 26a, 26b of the guide plate 20. An anchor 42a, 42b is fixedly coupled with the support plate 28. Movement of the actuating arm 14a, 14b through the respective arm receiving slot 24a, 24b when the seatback frame 16 moves between the upright position and the fully reclined position is configured to simultaneously move the anchor 42a, 42b between an extended position and a retracted position. The extended position of the anchor 42a, 42b corresponds with the upright position of the seatback frame 16, and the retracted position of the anchor 42a, 42b corresponds with the reclined position of the seatback frame 16. A spring 44 is coupled with the guide plate 20 and the guide tab 40a, 40b of the support plate 28. The spring 44 is configured to bias the anchor 42a, 42b toward the extended position.

Referring now to FIG. 1, the seating assembly 12 is shown including the seat base frame 22 and the seatback frame 16.

Figure 7:
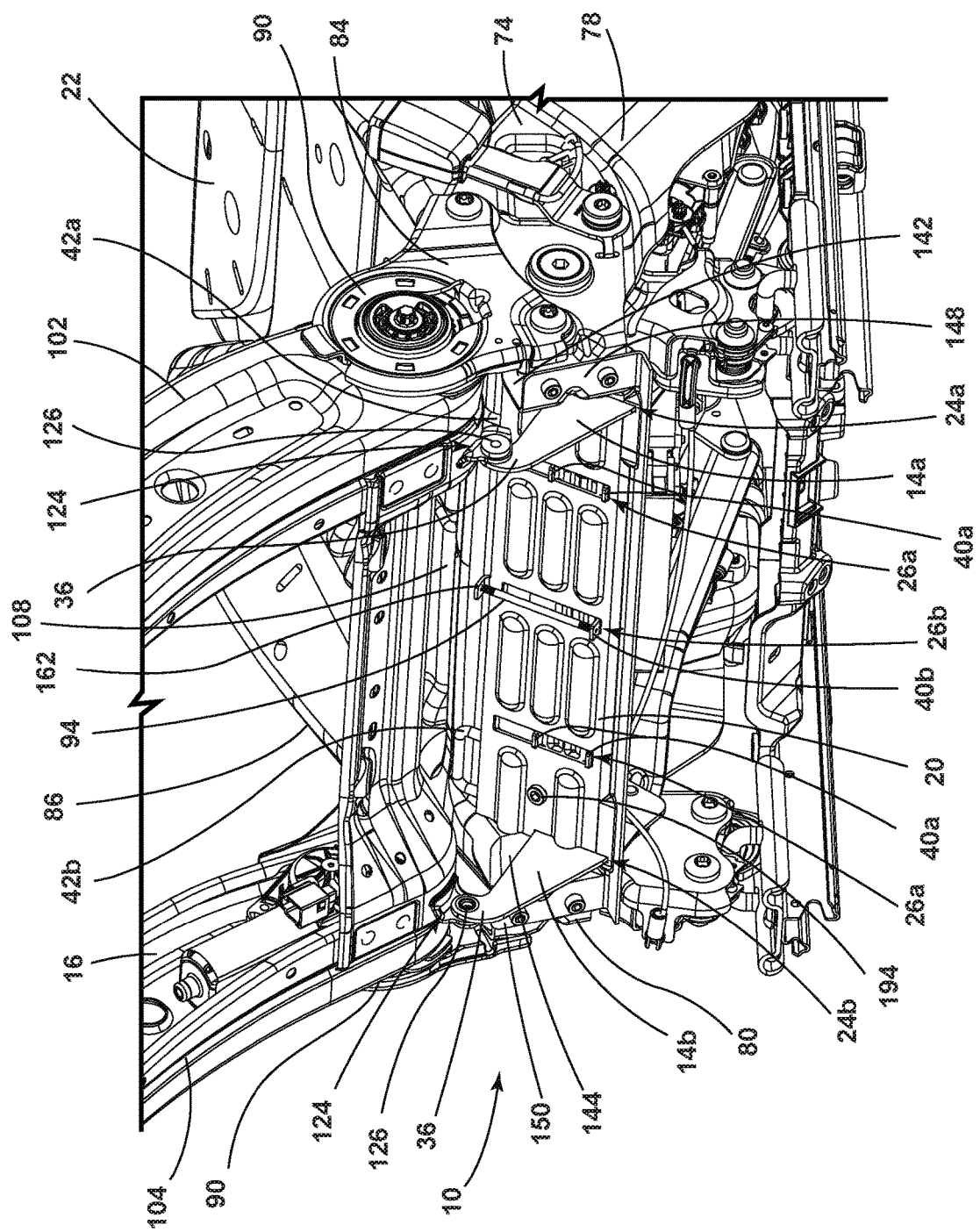
FIG. 7 is a rear perspective view of the seating assembly of FIG. 6 with an anchor assembly in a second position, according to various examples.

The seatback frame 16 is movable between at least an upright, or design, position (FIG. 1) and a fully reclined position (FIG. 7). Each of the seat base frame 22 and the seatback frame 16 may be configured to support and/or be coupled with cushioning and/or trim stock (not shown) of the seating assembly 12. It is contemplated that the seating assembly 12 may be used in any type of vehicle, such as a car, a truck, a van, etc., and may be positioned as a front seat, rear seat, or any other seat depending on the configuration of the vehicle.

As shown in FIGS. 1-5, the seating assembly 12 includes the retractable anchor assembly 10 configured to provide anchors 42a, 42b to act as child seat anchors (e.g., ISOFix anchors) for coupling a child seat (not shown) with the seating assembly 12. The retractable anchor assembly 10 is movable between a first position (FIGS. 2, 8, and 10) and a second position (FIGS. 6, 9, and 11). The anchors 42a, 42b of the anchor assembly 10 may be concealed by the cushioning and/or trim stock of the seating assembly 12. As discussed in more detail elsewhere herein, the retractable anchor assembly 10 may be configured to retract the anchors 42a, 42b when the seatback frame 16 is reclined to prevent an occupant from leaning against the anchors 42a, 42b, which may increase comfort for the occupant when the seatback frame 16 is in the reclined position.

As illustrated, the seating assembly 12 may include a base assembly 74 having first and second lateral supports 78, 80 extending upward and oriented to frame the seat base frame 22. A first side 84 of the seat base frame 22 may be fixedly or movably coupled with the first lateral support 78, and a second side 86 of the seat base frame 22 may be fixedly or movably coupled with the second lateral support 80. It will be understood that where one side 84, 86 of the seat base frame 22 is movably coupled with the base assembly 74, the opposing side 84, 86 is also movably coupled with the base assembly 74.

Each of the first and second lateral supports 78, 80 of the base assembly 74 includes a seatback extension 90 that extends upward past the seat base frame 22 and defines a pivot 94, 96. A first side 102 of the seatback frame 16 is rotatably coupled with the seat back extension 90 of the first lateral support 78 at the first pivot point 94, and a second, opposing side 104 of the seatback frame 16 is rotatably coupled with the seat back extension 90 of the second lateral support 80 at the second pivot point 96. Each of the pivots 94, 96 may be configured as a recliner heart and an elongated transverse connector 98 may extend between and terminate at the first and second pivot points 94, 96. The pivots 94, 96 as recliner hearts and the transverse connector 98 may be configured to facilitate simultaneous movement of each side 102, 104 of the seatback frame 16 relative to the base assembly 74.

Figure 2:
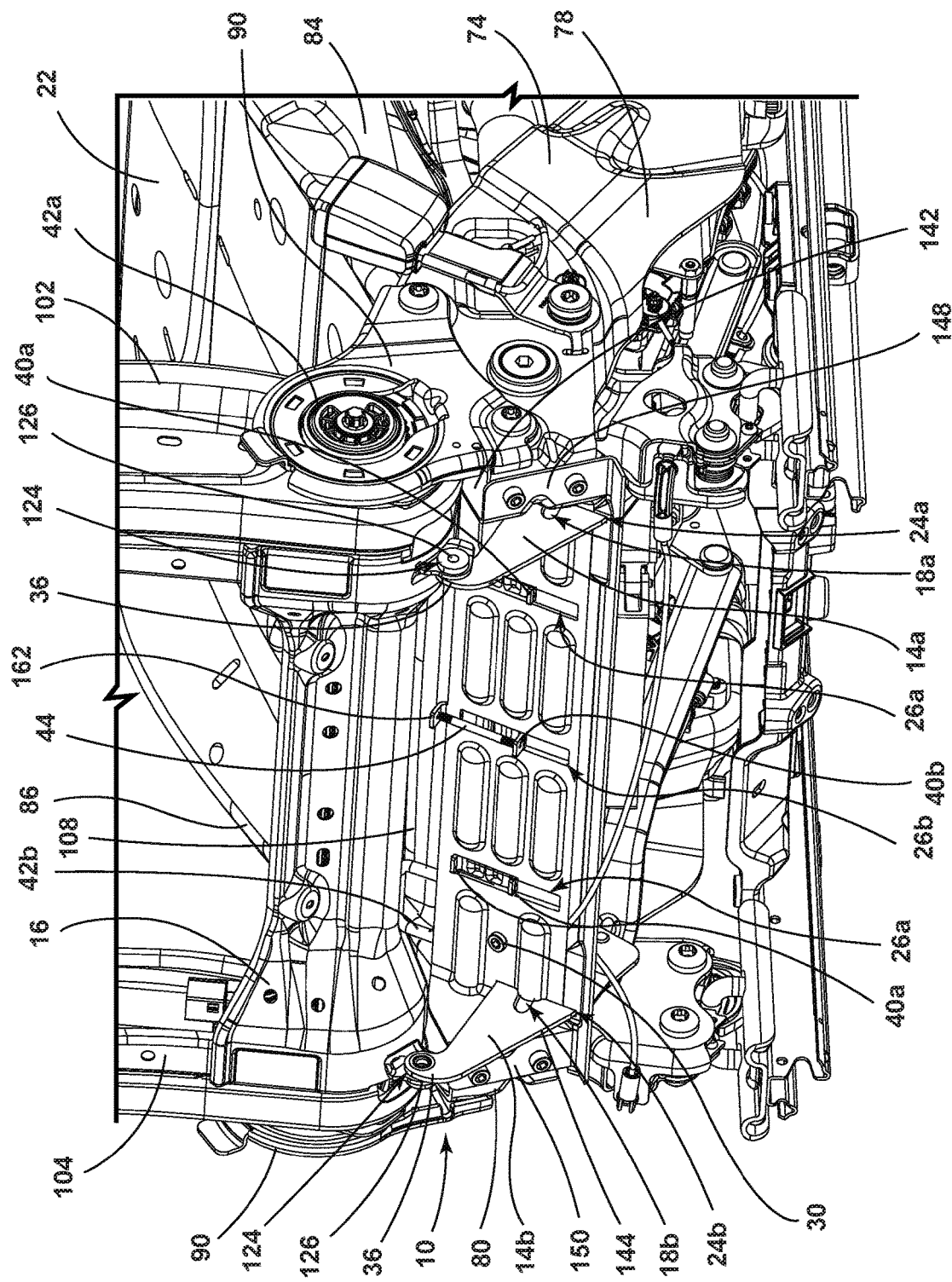
FIG. 2 is a rear perspective view of the seating assembly of FIG. 1 with an anchor assembly in a first position, according to various examples.
Figure 3:
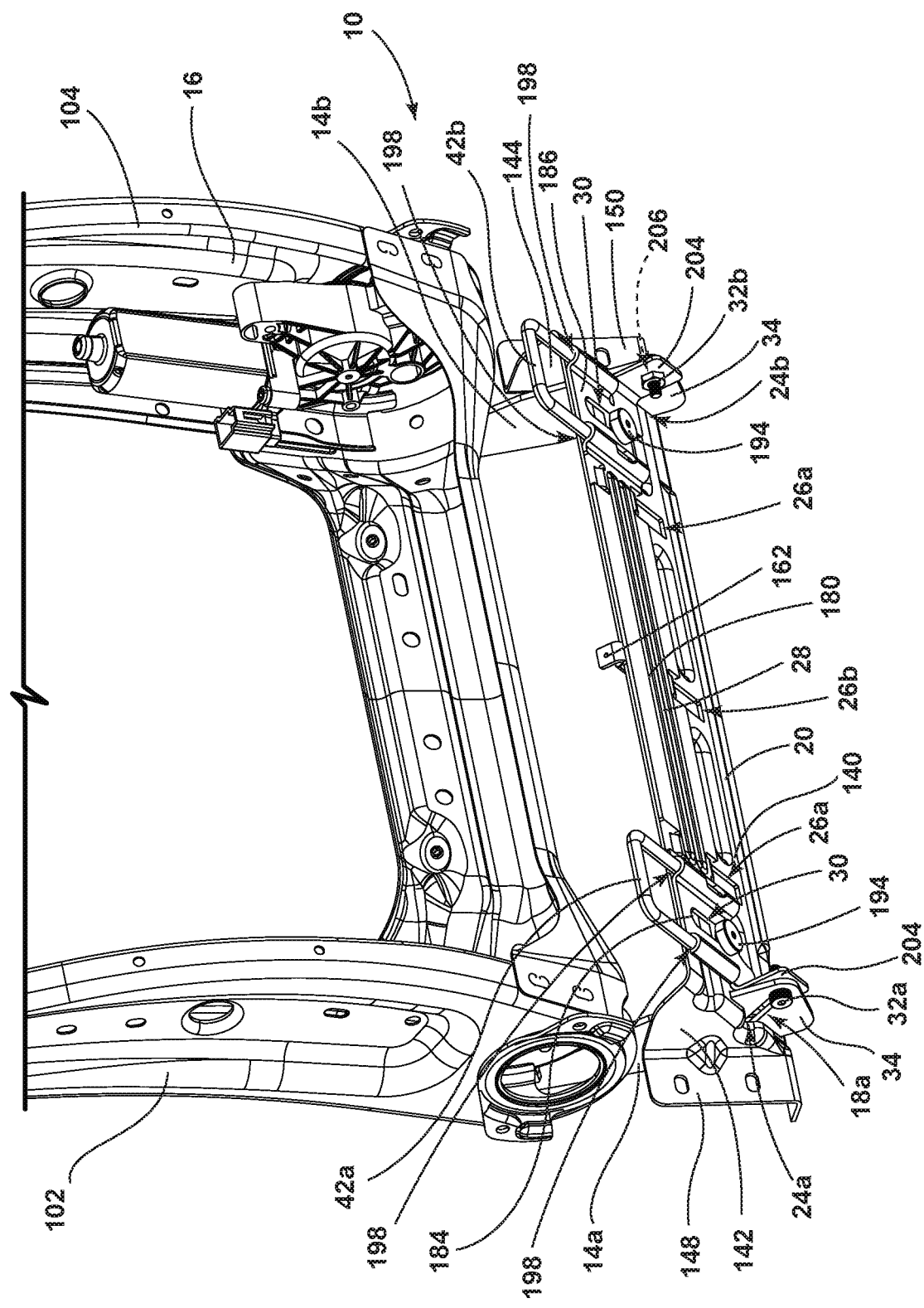
FIG. 3 is a front perspective view of the anchor assembly of FIG. 2 coupled with a seatback frame.
Figure 4:
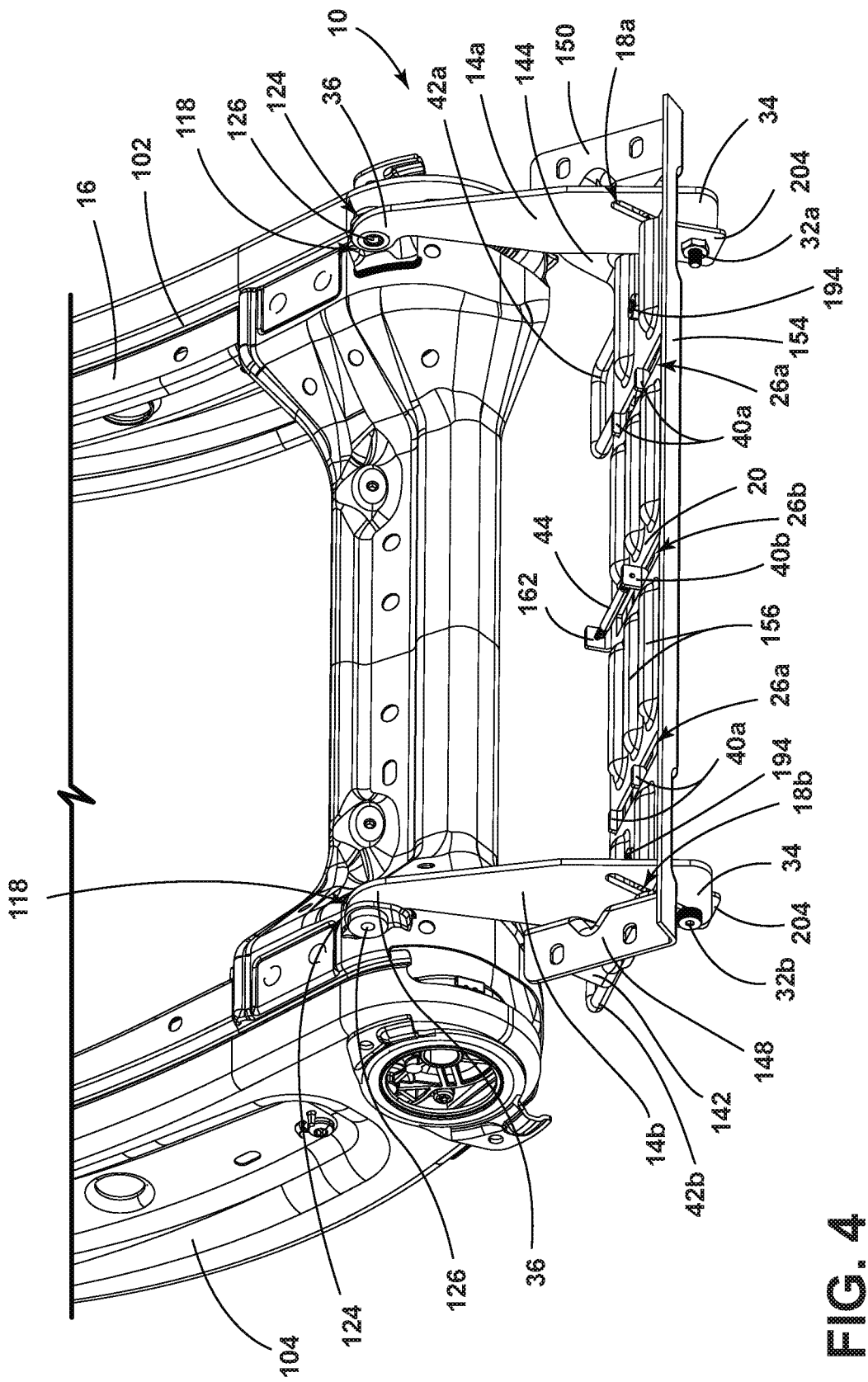
FIG. 4 is a rear perspective view of the anchor assembly and seatback frame of FIG. 3.

Referring now to FIGS. 2-4, the seating assembly 12 further includes the retractable anchor assembly 10 extending between the first and second lateral supports 78, 80 of the base assembly 74 and aligned with a rear edge 108 of the seat base frame 22. As previously introduced, the retractable anchor assembly 10 includes the guide plate 20 coupled with the first and second lateral supports 78, 80, at least one actuating arm 14a, 14b coupled with the seatback frame 16 and extending through the arm receiving slot 24a, 24b of the guide plate 20, and the support plate 28 slidably coupled with the actuating arm 14a, 14b and the guide plate 20 and configured to support the anchors 42a, 42b.

Figure 5:
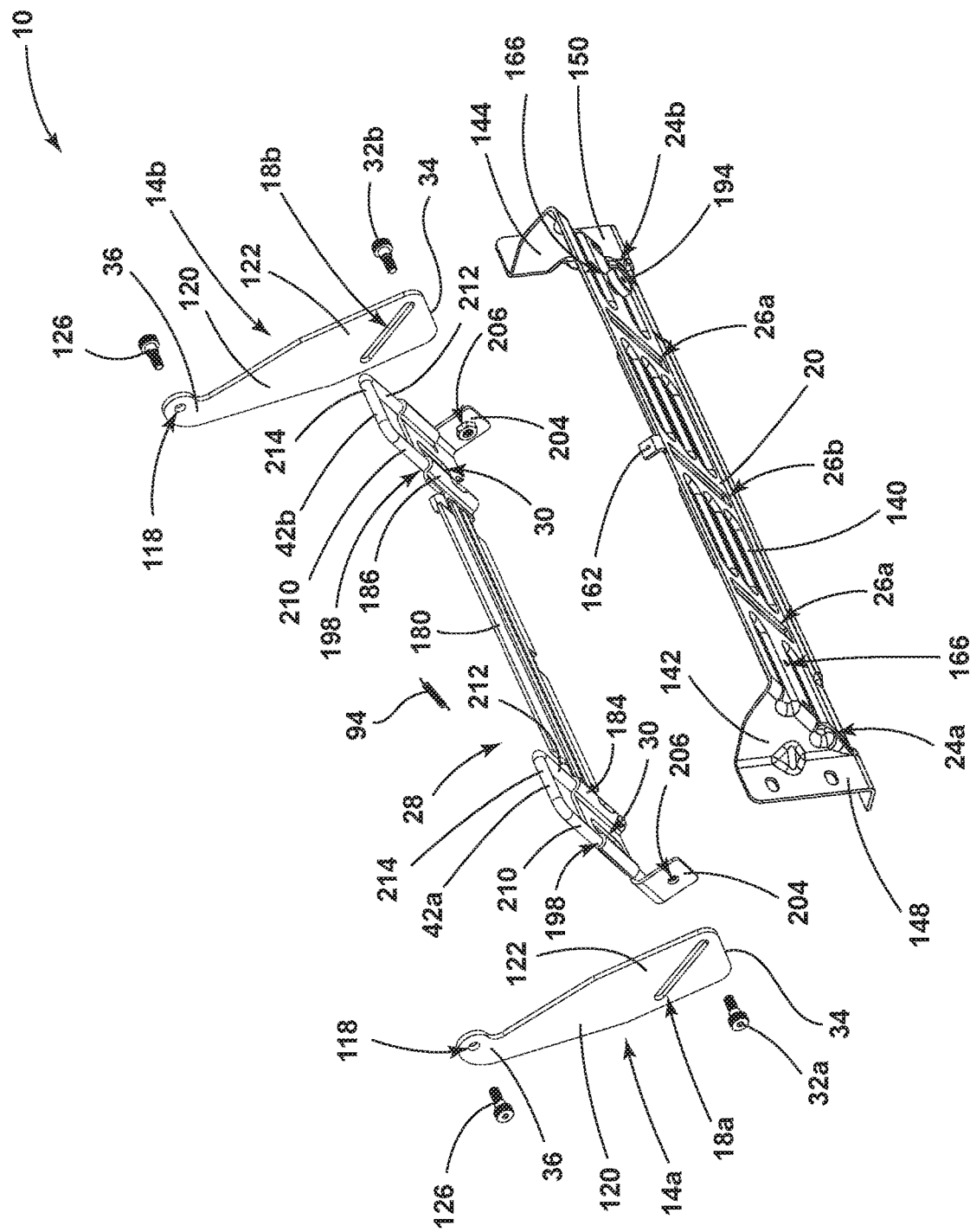
FIG. 5 is an exploded view of the anchor assembly of FIG. 3.
Figure 6:
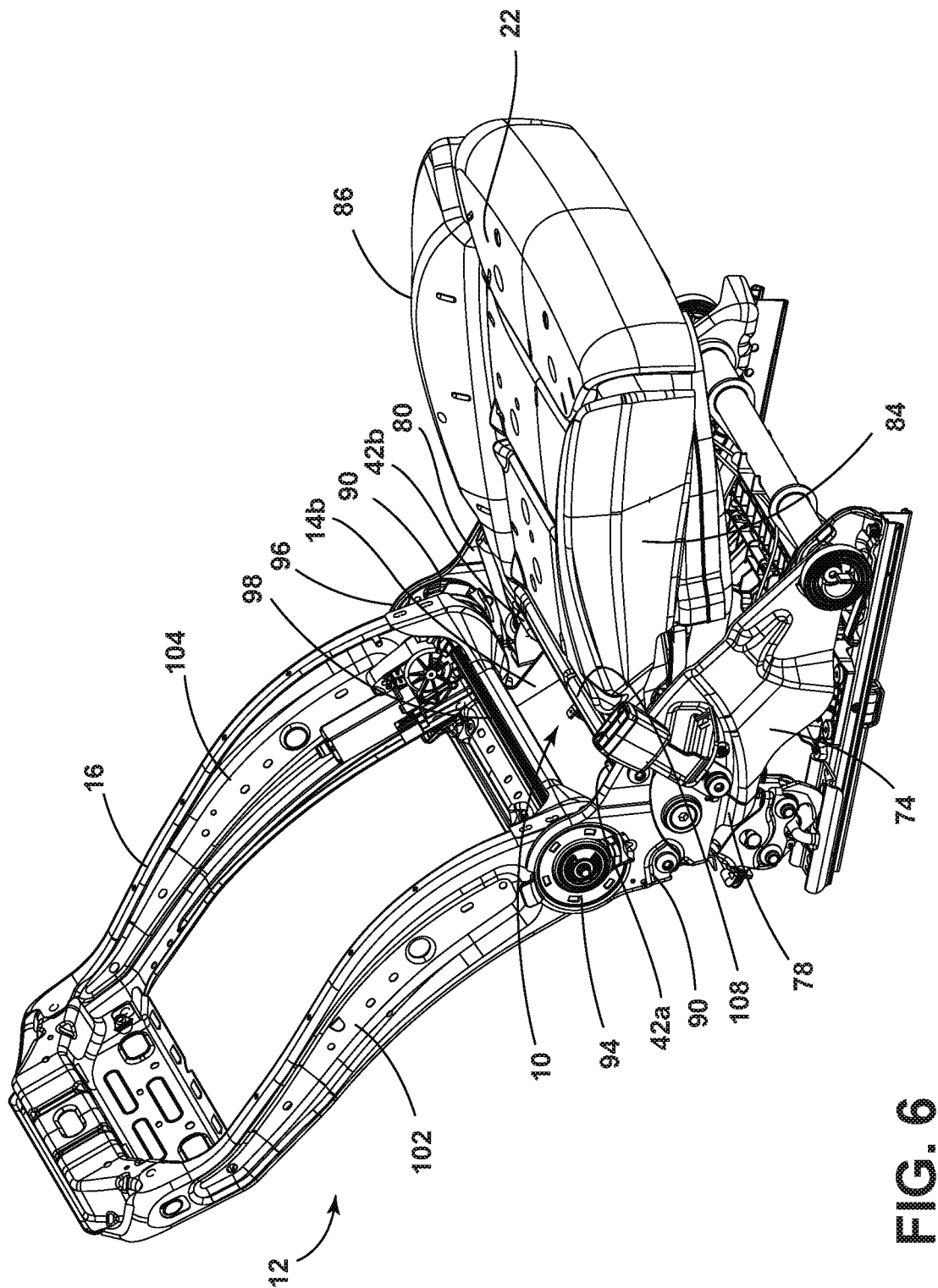
FIG. 6 is a side perspective view of the seating assembly of FIG. 1 in a second position, according to various examples.

As best shown in FIGS. 3-5, the actuating arm 14a, 14b may be one of first and second actuating arms 14a, 14b positioned on opposing sides of the retractable anchor assembly 10. Each actuating arm 14a, 14b includes an upper end 36 defining an opening 118 and a lower end 34. As illustrated, the upper end 36 may be an apex of a first portion 120 of the actuating arm 14a, 14b, and the lower end 34 may be at an opposite end of a second portion 122 of the actuating arm 14a, 14b. The first portion 120 of the actuating arm 14a, 14b may be tapered toward the upper end 36, and the second portion 122 of the actuating arm 14a, 14b may define the respective guide slot 18a, 18b. The guide slot 18a, 18b may be positioned at an incline extending from one side of the first portion 120 to an opposite side and may be inclined downward toward the lower end 34 (e.g., upward from the lower end 34 toward the upper end 36). When the retractable anchor assembly 10 is in the neutral position, the guide slots 18a, 18b are positioned at an angle relative to the bottom of the base assembly 74. When the retractable anchor assembly 10 is positioned in the retracted position, the guide slots 18a, 18b may be substantially parallel with the bottom of the base assembly 74. However, it is contemplated that the position of the guide slots 18a, 18b of the first and second actuating arms 14a, 14b may be any position that provides the directional movement for retracting the anchor 42a, 42b, as described elsewhere herein.

The first actuating arm 14a, 14b is pivotally coupled with the first side 102 of the seatback frame 16, and the second actuating arm 14a, 14b is pivotally coupled with the second side 104 of the seatback frame 16. Each side 102, 104 of the seatback frame 16 defines a receiving well 124. The receiving well 124 may be defined by any portion of the seatback frame 16. For example, each side 102, 104 of the seatback frame 16 may include a protrusion configured to define the receiving well 124. The receiving well 124 of each side 102, 104 is configured to be aligned with the opening 118 of the respective actuating arm 14a, 14b. Arm coupling pins 126 extend through each of the receiving wells 124 and the respective openings 118 to couple the first actuating arm 14a, 14b with the first side 102 of the seatback frame 16 and the second actuating arm 14a, 14b with the second side 104 of the seatback frame 16.

With continued reference to FIGS. 3-5, the retractable anchor assembly 10 further includes a guide plate 20 extending between the first and second lateral supports 78, 80 of the base assembly 74. The guide plate 20 includes a body portion 140 extending between first and second sidewalls 142, 144. The first and second sidewalls 142, 144 may be substantially triangular and may be positioned to abut the first and second lateral supports 78, 80, respectively. A first coupling flange 148 extends outward from the first sidewall 142, and a second coupling flange 150 extends outward in an opposite direction from the second sidewall 144. The first coupling flange 148 is coupled with the first lateral support 78 of the base assembly 74, and the second coupling flange 150 is coupled with the second lateral support 80 of the base assembly 74. A rear lip 154 extends rearward from the body portion 140 and may be integrally formed with the body portion 140. The rear lip 154 is positioned between the first and second sidewalls 142, 144 and may partially extend along the length of the body portion 140 or may extend along the entire length of the body portion 140.

The guide plate 20 defines first and second arm receiving slots 24a, 24b on opposing ends of the guide plate 20 proximate the first and second sidewalls 142, 144, respectively. The first arm receiving slot 24a is configured to receive the first actuating arm 14a, and the second arm receiving slot 24b is configured to receive the second actuating arm 14b. Each of the first and second arm receiving slots 24a, 24b is sized to receive one of the first and second actuating arms 14a, 14b at both the upper end 36 and the lower end 34. The first and second arm receiving slots 24a, 24b may be substantially the same size or may vary in size based on the respective actuating arm 14a, 14b. It is contemplated that guide plate 20 may define only a single arm receiving slot 24a or that the retractable anchor assembly 10 may include only one actuating arm 14a extending through one of the arm receiving slots 24a, 24b without departing from the scope of the present disclosure.

The guide plate 20 further defines a plurality of tab receiving slots 26a, 26b interspaced along the length of the body portion 140 of the guide plate 20. As illustrated, the plurality of tab receiving slots 26a, 26b includes side tab slots 26a positioned on opposing sides of a central tab slot 26b. The side tab slots 26a may be equally spaced from the central tab slot 26b or may be unevenly spaced from the central tab slot 26b. In various examples, each of the plurality of tab receiving slots 26a, 26b may all be the same size or similar sizes. In other examples, each of the plurality of tab receiving slots 26a, 26b may be differing sizes.

The guide plate 20 may further include a spring mount 162 extending from the body portion 140 and configured to be coupled with a spring 44. The spring mount 162 may be positioned proximate an upper edge 160 of the guide plate 20 and is aligned with one of the plurality of tab receiving slots 26a, 26b. As illustrated, the spring mount 162 may be aligned with the central tab receiving slot 26b. However, it will be understood that any one of the plurality of tab receiving slots 26a, 26b may be aligned with a spring mount 162 without departing from the scope of the present disclosure. It is further contemplated that the guide plate 20 may include multiple spring mounts 162 each aligned with a respective tab receiving slot 26a, 26b.

The guide plate 20 may further include a plurality of raised dimples 156 positioned along the body portion 140 of the guide plate 20. The plurality of raised dimples 156 may include any number of dimples 156 and may be positioned in any pattern or arrangement across the body portion 140. The plurality of dimples 156 may be any shape including oblong, as illustrated in FIG. 4. An aperture 166 may be defined between two of the plurality of dimples 156. The aperture 166 is configured to receive a coupling fastener 194 to couple the support plate 28 with the guide plate 20.

The retractable anchor assembly 10 further includes the support plate 28 having a central portion 180 extending between and integrally formed with first and second side portions 184, 186. At least one of the first and second side portions 184, 186 defines a coupling slot 30, as previously introduced. The coupling slot 30 is aligned with the aperture 166 of the guide plate 20 and is configured to receive the coupling fastener 194. The coupling fastener 194 is configured to slidably couple the support plate 28 with the guide plate 20 and to retain the support plate 28 relative to the guide plate 20, as described in more detail elsewhere herein.

As illustrated in FIGS. 3 and 4, when the support plate 28 is coupled with the guide plate 20 by the coupling fastener 194, the first and second side portions 184, 186 are positioned proximate the first and second sidewalls 142, 144, respectively. Each of the first and second side portions 184, 186 includes a protrusion 204 that extends from the respective side portion 184, 186 and is perpendicular to the support plate 28. Each protrusion 204 is positioned proximate one of the arm receiving slots 24a, 24b of the guide plate 20 and defines a receiving well 206 configured to be aligned with the guide slot 18a, 18b of the respective actuating arm 14a, 14b. Each receiving well 206 is configured to receive a respective side fastener 32a, 32b that is further received by the corresponding guide slot 18. Each fastener 32a, 32b is configured to couple the respective protrusion 204 and actuating arm 14a, 14b so that the fastener 32a, 32b is movable along the respective guide slot 18a, 18b.

The support plate 28 further includes a plurality of tabs 40a, 40b extending from the central portion 180. The plurality of tabs 40a, 40b may include pairs of side tabs 40a and a central tab 40b. The central tab 40b is configured to be received by and slidable along the central tab receiving slot 26b and is configured to be coupled with the spring 44. When the retractable anchor assembly 10 is assembled, the central tab 40b is aligned with the spring mount 162 of the guide plate 20 and the spring 44 extends between the central tab 40b and the spring mount 162. The pairs of side tabs 40a are configured to be received by the side tab slots 26a and are configured to guide the movement of the support plate 28 relative to the guide plate 20.

Each of the first and second side portions 184, 186 of the support plate 28 may define anchor channels 198 configured to receive first and second anchors 42a, 42b, respectively. Each of the first and second anchors 42a, 42b may include first and second legs 210, 212 and a central portion 214 such that the anchors 42a, 42b are substantially U-shaped. However, it is contemplated that the anchors 42a, 42b may be any shape configured to be used as an ISOFix anchor without departing from the scope of the present disclosure. It is further contemplated that the support plate 28 may be configured to support one anchor, two anchors, three anchors, or any other number of anchors without departing from the scope of the present disclosure.

The anchor channels 198 of the first and second side portions 184, 186 may be defined as pairs to receive first and second legs 210, 212 of each anchor 42a, 42b. For example, the first side portion 184 may define a pair of anchor channels 198 configured to receive first and second legs 210, 212 of the first anchor 42a, and the second side portion 186 may define a pair of anchor channels 198 configured to receive first and second legs 210, 212 of the second anchor 42b.

Figure 8:
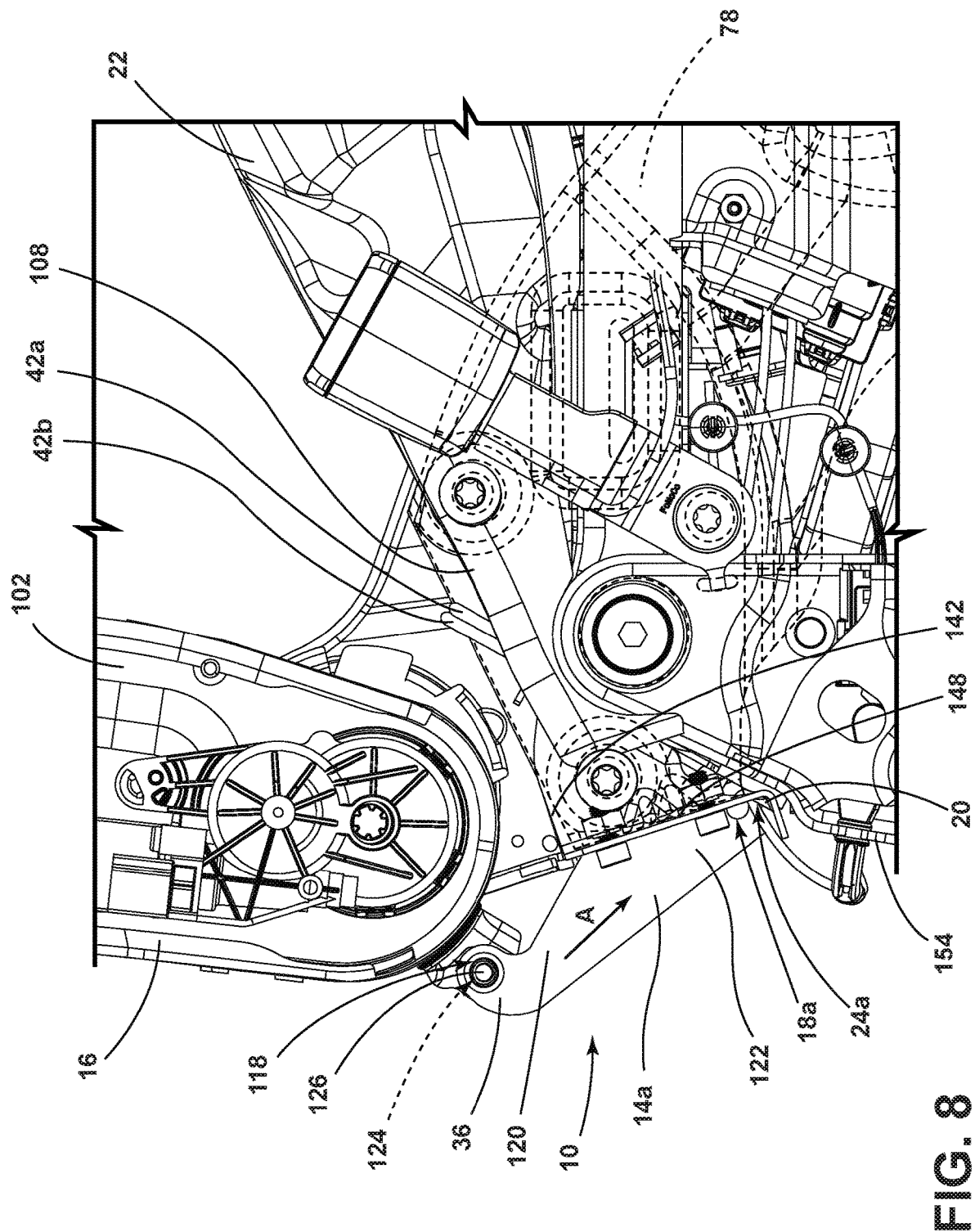
FIG. 8 is a partial enlarged view of the anchor assembly of FIG. 2 in a first position with a guide plate shown in phantom, according to various examples.
Figure 9:
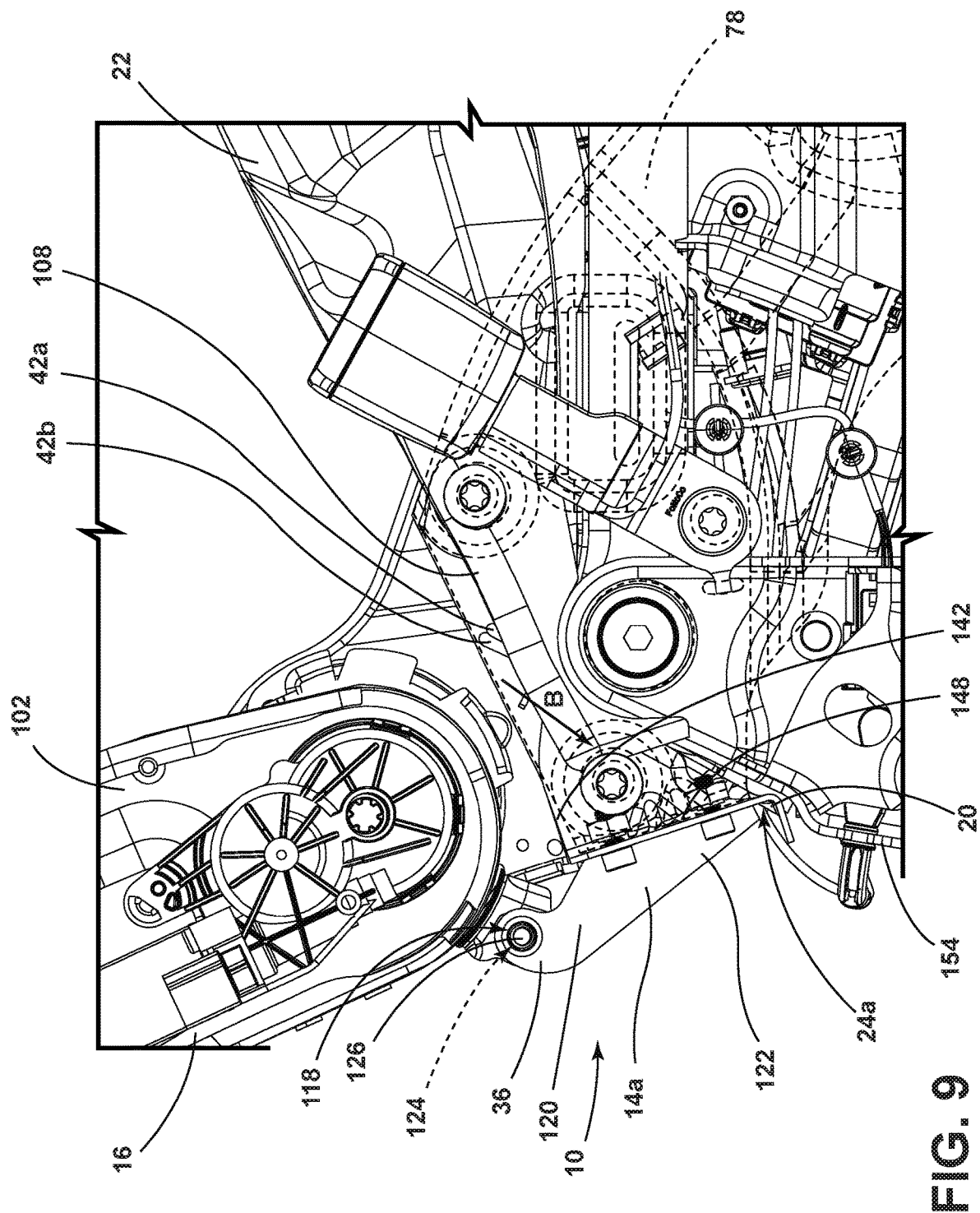
FIG. 9 is a partial enlarged view of the anchor assembly of FIG. 7 in a second position with a guide plate shown in phantom, according to various examples.
Figure 10:
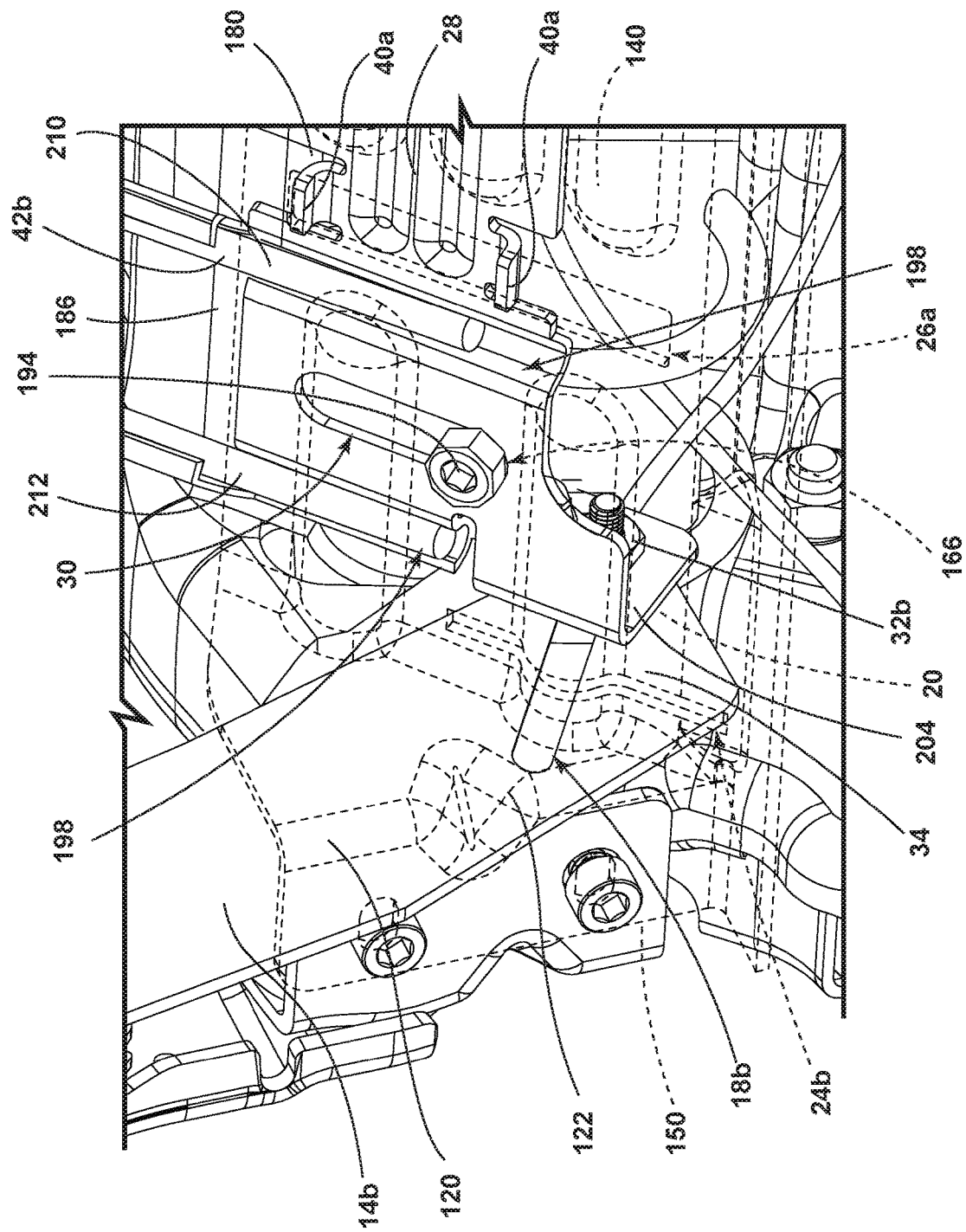
FIG. 10 is a partial side profile view of the seating assembly of FIG. 1 with an anchor assembly in a first position.
Figure 11:
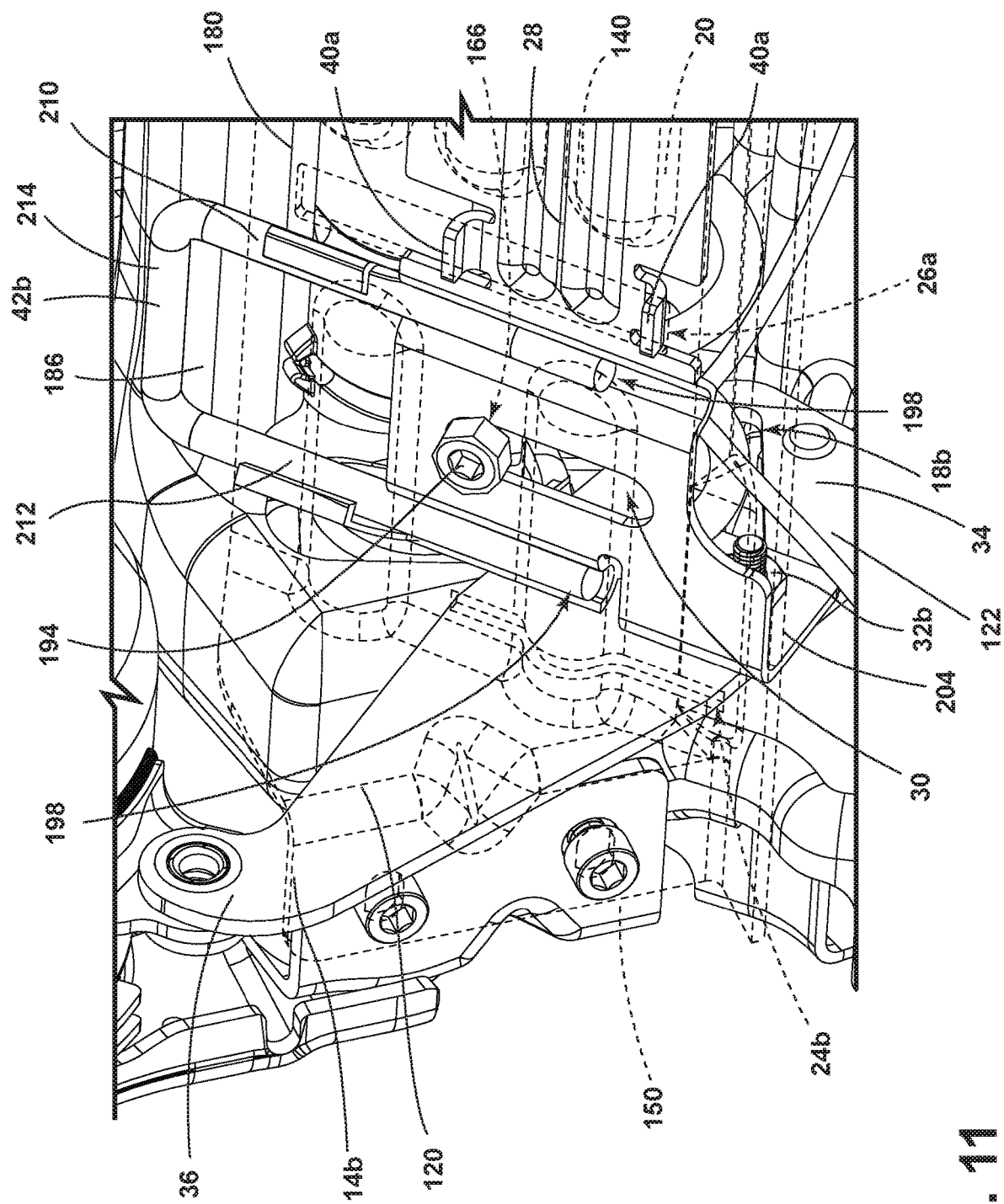
FIG. 11 is a partial side profile view of the seating assembly of FIG. 7 with an anchor assembly in a second position.

As illustrated in FIGS. 2, 8, and 10, when the seatback frame 16 is in the design or upright position, the retractable anchor assembly 10 is in a first position (e.g., the extended position). As best shown in FIG. 2, in the first position, the second portion 122 of each actuating arm 14a, 14b is received by the respective arm receiving slot 24a, 24b so that the first portion 120 of each actuating arm 14a, 14b is positioned at least partially below the guide plate 20 and the second portion 122 is position on at least partially above the guide plate 20. The support plate 28 is positioned such that the plurality of tabs 40a, 40b are positioned such that the pairs of side tabs 40a are at a top end of the respective tab receiving slots 26a and the central tab 40b is positioned spaced apart from the spring mount 162. The spacing between the central tab 40b and the spring mount 162 is configured to place the spring 44 in a first, unloaded state.

As best shown in FIG. 8, when the retractable anchor assembly 10 is in the first position, each side fastener 32a, 32b is at a forward end of the guide slot 18a, 18b of the respective actuating arm 14a, 14b. The coupling fastener 194, which is fixedly coupled with the guide plate 20, is at a first end of the coupling slot 30. The anchor 42b is illustrated extended beyond the rear edge 108 of the seat base frame 22. It will be understood that the first anchor 42a is in the same or a similar position and/or configuration when the retractable anchor assembly 10 is in the first position.

When the seatback frame 16 is moved from the design position (FIG. 1) to the reclined position (FIG. 6), the retractable anchor assembly 10 is moved to the second position (e.g., the retracted position). The retractable anchor assembly 10 is illustrated in the second position in FIGS. 7, 9, and 11. The movement of the seatback frame 16 pushes the actuating arms 14a, 14b through the arm receiving slots 24a, 24b of the guide plate 20 in a first direction shown by arrow A (FIG. 8). As best illustrated in FIG. 7, in the second position, the second portion 122 of each actuating arm 14a, 14b is at least partially received by the respective arm receiving slot 24a, 24b and each side fastener 32a, 32b is moved from the forward end of the respective guide slot 18a, 18b to the rear end of the respective guide slot 18a, 18b. The movement along the inclined guide slot 18a, 18b is configured to move the support plate 28 and the anchors 42a, 42b relative to the guide plate in a second direction shown by arrow B (FIG. 9). The movement of the support plate 28 in the second direction moves the plurality of tabs 40a, 40b toward a bottom end of the respective tab receiving slots 26a, 26b and places the spring 44 in a second, loaded state. The spring 44 is configured to bias the support plate 28, and the other components of the retractable anchor assembly 10, toward the first, or extended, position. The coupling fastener 194 is also moved from the first end of the coupling slot 30 to the second end of the coupling slot 30 and the anchors 42a, 42b are retracted such that the central portion 214 of each anchor 42a, 42b is substantially aligned with the rear edge 108 of the seat base frame 22. It is contemplated that the seatback frame 16 may be configured to recline to various degrees and may be positioned in any position between the upright position and the fully reclined position. Movement of the retractable anchor assembly 10 between the first position and the second position is configured to be proportional to the movement of the seatback frame 16 between the upright position and the fully reclined position. This movement allows the anchors 42a, 42b to be retracted when the seatback frame 16 is reclined. This may prevent the anchors 42a, 42b from being exposed in the reclined position and may increase comfort for an occupant of the seating assembly 12.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A retractable anchor assembly for a seating assembly, comprising:
   an actuating arm operably coupled with a seatback and defining a guide slot, wherein the actuating arm is movable with the seatback;
   a guide plate coupled with a seat base and defining an arm receiving slot sized to receive the actuating arm;
   a support plate slidably coupled with the guide plate, wherein the support plate includes a side fastener received by the guide slot of the actuating arm; and
   an anchor coupled with the support plate, wherein movement of the actuating arm through the arm receiving slot moves the support plate and anchor between an extended positioned and a retracted position.

2. The retractable anchor assembly of claim 1, wherein the support plate defines a coupling slot that receives a coupling fastener extending from guide plate, and further wherein the coupling fastener is positioned at a first end of the coupling slot when the support plate and the anchor are in the extended position and is positioned at a second end of the coupling slot when the support plate and the anchor are in the retracted position.

3. The retractable anchor assembly of claim 1, wherein the actuating arm includes a first end and a second end, and further wherein the guide slot is defined at an incline extending upward away from the second end.

4. The retractable anchor assembly of claim 1, wherein the side fastener is fixedly coupled with the support plate, and further wherein the support plate is in the extended position when the side fastener is at an upper end of the guide slot and is in the retracted position when the side fastener is at a lower end of the guide slot.

5. The retractable anchor assembly of claim 1, wherein a spring is coupled with the support plate and the guide plate, and further wherein the support plate is biased by the spring toward the extended position.

6. The retractable anchor assembly of claim 1, wherein the support plate includes at least one guide tab, and further wherein the guide plate defines at least one tab receiving slot that receives the at least one guide tab.

7. The retractable anchor assembly of claim 1, wherein the anchor is one of a pair of child seat anchors.

8. A retractable anchor assembly for a seating assembly, comprising:
   an actuating arm operably coupled with a seatback and defining a guide slot;
   a guide plate coupled with a seat base and defining an arm receiving slot proximate an end of the guide plate, wherein the arm receiving slot is that receives the actuating arm, and further wherein the actuating arm is moved through the arm receiving slot when the seatback is moved between an upright position and a reclined position;
   a support plate slidably coupled with the guide plate and including a side fastener received by and movable along the guide slot of the actuating arm;
   an anchor extending from the support plate, wherein movement of the actuating arm through the arm receiving slot moves the anchor between an extended position and a retracted position; and
   a spring extending between and coupled with the guide plate and the support plate, wherein the spring biases the anchor in the extended position.

9. The retractable anchor assembly of claim 8, wherein the guide plate defines a tab receiving slot and includes a spring mount proximate an end of the tab receiving slot, and further wherein the support plate includes a guide tab received by the tab receiving slot.

10. The retractable anchor assembly of claim 9, wherein the spring extends between the spring mount of the guide plate and the guide tab of the support plate.

11. The retractable anchor assembly of claim 8, wherein the guide plate includes first and second sidewalls extending upward from a body of the guide plate, wherein each of the first and second sidewalls includes a coupling flange aligned with and coupled with the seat base.

12. The retractable anchor assembly of claim 11, wherein the coupling flanges of the first and second sidewalls are positioned at an angle relative to the body of the guide plate to align the support plate and anchor with a rear edge of the seat base.

13. The retractable anchor assembly of claim 8, further comprising:
   a coupling fastener fixedly coupled with the guide plate, wherein the support plate defines a coupling slot that receives the coupling fastener to slidably couple the support plate with the guide plate.

14. The retractable anchor assembly of claim 13, wherein the coupling fastener is positioned at a first end of the coupling slot when the anchor is in the extended position and is positioned at a second end of the coupling slot when the anchor is in the retracted position.

15. The retractable anchor assembly of claim 8, wherein the anchor is a child seat anchor.

16. The retractable anchor assembly of claim 8, wherein the upright position of the seatback corresponds with the extended position of the anchor and the reclined position of the seatback corresponds with the retracted position of the anchor.

17. A retractable anchor assembly for a seating assembly, comprising:
   an actuating arm rotatably coupled with a seatback and defining an inclined guide slot;
   a guide plate coupled with a seat base and defining an arm receiving slot and a tab receiving slot, and further wherein the actuating arm is received by the arm receiving slot;
   a support plate slidably coupled with the guide plate and defining an anchor guide;
   a side fastener coupled with the support plate and slidably received by the guide slot of the actuating arm, wherein the side fastener is positioned at a lower end of the guide slot when the seatback is in an upright position and is positioned at an upper end of the guide slot when the seatback is in a reclined position;
   a guide tab integrally formed with the support plate and received by the tab receiving slot of the guide plate;
   an anchor coupled with the support plate, wherein movement of the actuating arm through the arm receiving slot moves the anchor between an extended position and a retracted position, and further wherein the extended position corresponds with the upright position of the seatback and the retracted position corresponds with the reclined position of the seatback; and
   a spring coupled with the guide plate and the guide tab of the support plate, wherein the spring biases the anchor in the extended position.

18. The retractable anchor assembly of claim 17, wherein the anchor is a child seat anchor.

19. The retractable anchor assembly of claim 17, further comprising:
   a spring mount extending from the guide plate proximate an end of the tab receiving slot, wherein the spring is coupled with the spring mount.

20. The retractable anchor assembly of claim 17, wherein the actuating arm comprises a pair of actuating arms positioned on opposing sides of the seatback, and wherein the arm receiving slot of the guide plate is one of a pair of arm receiving slots defined on opposing ends of the guide plate.

* * * * *